(12) United States Patent
Waldman et al.

(10) Patent No.: US 9,313,562 B2
(45) Date of Patent: Apr. 12, 2016

(54) WAVELENGTH AUTO-NEGOTIATION

(71) Applicant: MELLANOX TECHNOLOGIES LTD., Yokneam (IL)

(72) Inventors: Eyal Waldman, Tel Aviv (IL); Shai Cohen, Haifa (IL); Evelyn Landman, Haifa (IL); Benny Koren, Zichron Yaakov (IL); Shmuel Levy, Kyriat Tivon (IL)

(73) Assignee: MELLANOX TECHNOLOGIES LTD., YOKNEAM (IL)

( * ) Notice: Subject to any disclaimer, the term of this patent is extended or adjusted under 35 U.S.C. 154(b) by 270 days.

(21) Appl. No.: 13/958,561

(22) Filed: Aug. 4, 2013

(65) Prior Publication Data

US 2015/0037029 A1    Feb. 5, 2015

(51) Int. Cl.
*H04Q 11/00*   (2006.01)
*H04B 10/29*   (2013.01)

(52) U.S. Cl.
CPC .......... *H04Q 11/0005* (2013.01); *H04B 10/29* (2013.01); *H04Q 2011/0009* (2013.01); *H04Q 2011/0016* (2013.01); *H04Q 2011/0037* (2013.01)

(58) Field of Classification Search
CPC ..................................................... H04B 10/29
See application file for complete search history.

(56) References Cited

U.S. PATENT DOCUMENTS

| | | |
|---|---|---|
| 7,502,563 B2 | 3/2009 | Nozue et al. |
| 7,720,384 B2 | 5/2010 | Kunimatsu et al. |
| 8,090,268 B2 * | 1/2012 | Pamart et al. ................. 398/154 |
| 2005/0163503 A1 * | 7/2005 | Lee ...................... H04B 10/506 398/19 |
| 2005/0244161 A1 | 11/2005 | Satoh |
| 2011/0286745 A1 * | 11/2011 | Sugahara et al. ............... 398/48 |
| 2012/0080672 A1 * | 4/2012 | Rong et al. ...................... 257/48 |
| 2012/0315040 A1 | 12/2012 | Dahlfort et al. |
| 2013/0200431 A1 * | 8/2013 | Coimbatore Balram et al. ............................. 257/183 |
| 2014/0105596 A1 * | 4/2014 | Oda et al. ........................ 398/34 |

* cited by examiner

*Primary Examiner* — Nathan Curs
(74) *Attorney, Agent, or Firm* — D.Kligler IP Services Ltd.

(57) ABSTRACT

An apparatus includes a bank of optical detectors, an input optical filter and a selector. The optical detectors are configured to output respective detection indications in response to detecting a presence of an optical signal. The input optical filter is configured to receive an input optical signal having an input wavelength, and to route the input optical signal to one of the optical detectors in the bank depending on the input wavelength. The selector is configured to select an output wavelength based on the detection indications of the optical detectors, and to cause generation and transmission of an output optical signal at the selected output wavelength.

18 Claims, 2 Drawing Sheets

WAVELENGTH AUTO-NEGOTIATION

FIELD OF THE INVENTION

The present invention relates generally to optical communication, and particularly to methods and systems for wavelength negotiation.

BACKGROUND OF THE INVENTION

Some optical systems, such as Wavelength Division Multiplexing (WDM) systems, transmit and receive modulated optical signals over optical fibers. Various techniques for allocating wavelength to optical carriers are known in the art.

For example, U.S. Patent Application Publication 2005/0244161, whose disclosure is incorporated herein by reference, describes an optical transmission system in which a transmission section outputs plural monochromatic-wavelength lights individually, a first allocation section allocates a wavelength of a monochromatic-wavelength light based on a power of the monochromatic-wavelength light individually outputted from the transmission section from among the plural monochromatic-wavelength lights, a notification section issues a notification of wavelength information of the monochromatic-wavelength lights allocated by the first allocation section to the transmission section, and a first control section controls wavelengths of the monochromatic-wavelength lights to be outputted from the transmission section based on the wavelength information of the notification issued from the notification section.

As another example, U.S. Pat. No. 7,720,384, whose disclosure is incorporated herein by reference, describes a transponder in a WDM apparatus, which detects a wavelength of received light having one of plural wavelengths multiplexed or divided by a WDM unit, determines a transmission wavelength which is a wavelength of a light to be transmitted to the WDM unit on the basis of the wavelength of the received light, and sets to convert the wavelength of the light to be transmitted to the WDM unit into the transmission wavelength, and transmit the converted light.

SUMMARY OF THE INVENTION

An embodiment of the present invention that is described herein provides an apparatus including a bank of optical detectors, an input optical filter and a selector. The optical detectors are configured to output respective detection indications in response to detecting a presence of an optical signal. The input optical filter is configured to receive an input optical signal having an input wavelength, and to route the input optical signal to one of the optical detectors in the bank depending on the input wavelength. The selector is configured to select an output wavelength based on the detection indications of the optical detectors, and to cause generation and transmission of an output optical signal at the selected output wavelength.

In some embodiments, the apparatus further includes multiple lasers that are set to multiple respective output wavelengths, and the selector is configured to activate, based on the detection indications of the optical detectors, only a selected laser from among the multiple lasers that has the selected output wavelength.

In an embodiment, the selector is configured to activate the selected laser by connecting only the selected laser to a power supply. In another embodiment, the apparatus includes an output optical filter, which is configured to route outputs of the multiple lasers to a modulator that modulates data onto the selected output wavelength.

In a disclosed embodiment, the selector is configured to select the output wavelength to be equal to the input wavelength. In an example embodiment, each of the optical detectors is non-tunable and simultaneously covers all possible values of the output wavelength. In an embodiment, the bank of optical detectors and the input optical filter are fabricated in a silicon layer that is disposed on a single insulator substrate. In another embodiment, the optical detectors are mounted on a single glass substrate, and the input optical filter is fabricated in the glass substrate.

There is additionally provided, in accordance with an embodiment of the present invention, an apparatus including a single substrate and optoelectronic circuitry, which is fabricated on the single substrate and which is configured to receive an input optical signal having an input wavelength, to identify the input wavelength, to select an output wavelength depending on the identified input wavelength, and to generate and transmit an output optical signal having the output wavelength.

In some embodiments, the single substrate includes an insulator, and the optoelectronic circuitry includes a Silicon Photonics (SiP) device fabricated in a Silicon-on-Insulator (SOI) configuration. In alternative embodiments, the single substrate includes a glass substrate, and the optoelectronic circuitry is disposed on the glass substrate. In an embodiment, the optoelectronic circuitry is fabricated in two or more semiconductor layers separated by one or more interposer layers.

There is also provided, in accordance with an embodiment of the present invention, a method including receiving an input optical signal having an input wavelength. The input optical signal is routed using an input optical filter, depending on the input wavelength, to one of multiple optical detectors that are configured to output respective detection indications in response to detecting a presence of an optical signal. An output wavelength is selected based on the detection indications of the optical detectors. An output optical signal is generated and transmitted at the selected output wavelength.

There is further provided, in accordance with an embodiment of the present invention, a method including providing a single substrate, and fabricating on the single substrate optoelectronic circuitry, which receives an input optical signal having an input wavelength, identifies the input wavelength, selects an output wavelength depending on the identified input wavelength, and generates and transmits an output optical signal having the output wavelength.

The present invention will be more fully understood from the following detailed description of the embodiments thereof, taken together with the drawings in which:

DETAILED DESCRIPTION OF EMBODIMENTS

Overview

Embodiments of the present invention that are described herein provide methods and systems for automatic wavelength negotiation, for use in optical communication equipment. In the disclosed embodiments, an auto-negotiation system receives an input optical signal having an input wavelength, and transmits an output optical signal having an output wavelength. The input wavelength is unknown a-priori. The system automatically identifies the input wavelength, and sets the output wavelength depending on the identified input wavelength.

In some embodiments, the system comprises a bank of optical detectors, and an optical filter that routes the input signal to one of the optical detectors based on the input wavelength. As a result, one of the optical detectors (whose identity depends on the input wavelength) will indicate positive detection, while the other optical detectors will indicate negative detection.

The detection indications of the optical detectors are used to control a selector circuit, which selects one of multiple lasers set to different output wavelengths. The selector circuit activates the appropriate laser depending on the detection indications, which in turn depend on the input wavelength. The laser output is modulated with the data for transmission, so as to produce the output optical signal at the selected output wavelength.

Several implementation variations of the wavelength negotiation system and its components, for use in various wavelength ranges, are described herein. Typically, the entire system is fabricated on a single substrate, e.g., in an integrated Silicon Photonics (SiP) device.

The disclosed configurations do not use any tunable optical elements that scan the range of possible wavelengths, but rather use a bank of detectors that operate in parallel. As a result, wavelength detection and setting is extremely fast, typically below 1 mS. This high-speed performance is especially important for optical network switching and routing applications.

System Description

Figure 1:
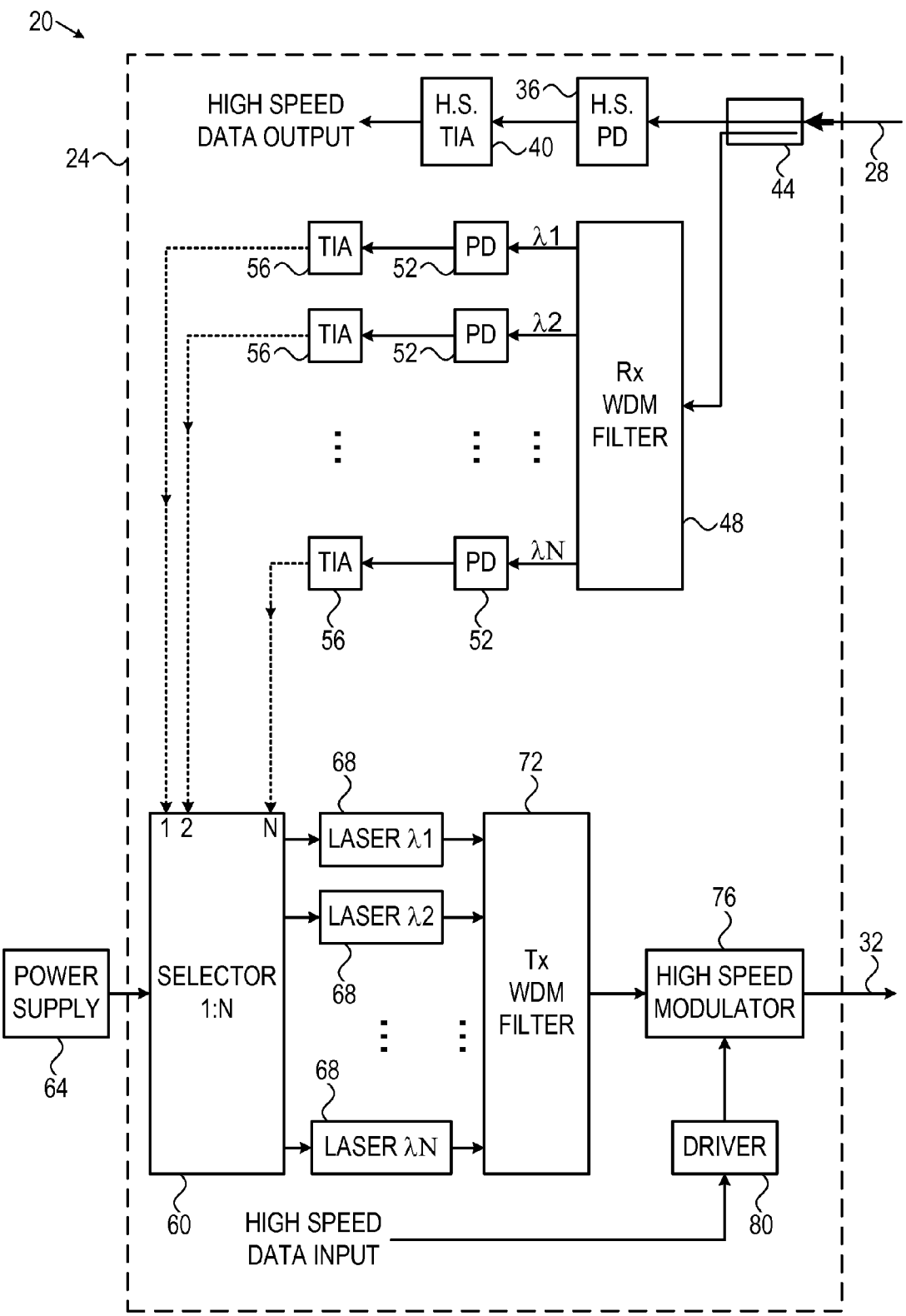
FIG. 1 is a block diagram that schematically illustrates a system for wavelength auto-negotiation, in accordance with an embodiment of the present invention.

FIG. 1 is a block diagram that schematically illustrates a system 20 for wavelength auto-negotiation, in accordance with an embodiment of the present invention. A system such as system 20 can be used, for example, in an optical network switch or router, or in any other suitable type of optical communication equipment. In a typical application, system 20 is used in a network element of a Wavelength Division Multiplexing (WDM) network. In the present context, the term "WDM" refers to any and all types and variants of WDM, such as, for example, Dense WDM (DWDM), Coarse WDM (CWDM) or any other suitable variant.

System 20 receives an input optical signal (referred to as "input signal" for brevity) over an input port 28, and transmits an output optical signal (referred to as "output signal" for brevity) over an output port 32. The system automatically identifies the wavelength of the input signal (referred to herein as "input wavelength") and sets the wavelength of the output signal (referred to herein as "output wavelength") depending on the identified input wavelength.

In a typical application, although not necessarily, system 20 sets the output wavelength to be equal to the input wavelength. Typically, the input signal and the output signal are exchanged with the same remote node. Alternatively, however, the source of the input signal and the destination of the output signal may be different nodes.

Typically, system 20 is fabricated on a single substrate 24. In an example embodiment, the entire system 20 is implemented in a Silicon Photonics (SiP) device, using a Silicon On Insulator (SOI) configuration. In another embodiment, the entire system 20 is fabricated on a single glass substrate. The choice of substrate and fabrication process may depend, for example, on the optical band of the input and output signals. These implementation aspects are addressed in greater detail below.

Input port 28 and output port 32 may comprise, for example, optical fibers or optical waveguides. The input and output ports may be coupled to the same fiber or waveguide or to different fibers or waveguides. In one example embodiment, the input and output ports are coupled to different optical fibers in the same optical cable.

In the embodiment of FIG. 1, the input signal is provided to a main reception path, which comprises a high-speed photo-detector (PD) 36 and a high-speed Trans-Impedance Amplifier (TIA) 40. PD 36 demodulates the optical signal and produces an electrical signal. TIA 40 amplifies the electrical signal and thus outputs a high-speed stream of data. The received data is provided as output of system 20.

In the embodiment of FIG. 1, the input wavelength is assumed to be selected from a set of N possible wavelengths denoted $\lambda 1 \ldots \lambda N$. The actual input wavelength of the input signal is unknown a-priori, and is identified by system 20. In an example embodiment, N=18, the wavelength spacing is 20 nm, and the possible input wavelengths are given in the following table:

TABLE 1 example wavelength set

| Wavelength index | Nominal center wavelength [nm] |
|---|---|
| $\lambda 1$ | 1271 |
| $\lambda 2$ | 1291 |
| $\lambda 3$ | 1311 |
| $\lambda 4$ | 1331 |
| $\lambda 5$ | 1351 |
| $\lambda 6$ | 1371 |
| $\lambda 7$ | 1391 |
| $\lambda 8$ | 1411 |
| $\lambda 9$ | 1431 |
| $\lambda 10$ | 1451 |
| $\lambda 11$ | 1471 |
| $\lambda 12$ | 1491 |
| $\lambda 13$ | 1511 |
| $\lambda 14$ | 1531 |
| $\lambda 15$ | 1551 |
| $\lambda 16$ | 1571 |
| $\lambda 17$ | 1591 |
| $\lambda 18$ | 1611 |

Alternatively, any other suitable set of wavelengths can be used.

In order to identify the input wavelength, an optical coupler 44 samples a portion of the optical signal for processing. In the present example, coupler 44 comprises a 3 dB coupler that samples 50% of the signal power. Alternatively, however, any other suitable coupling ratio can be used.

The sampled input signal is filtered by a receive (RX) WDM filter 48. (As noted above, the term WDM refers to WDM variants such as DWDM and CWDM, as well.) Filter 48 comprises an input, and N outputs corresponding to the N possible input wavelengths $\lambda 1 \ldots \lambda N$. The filter routes the optical signal from the input to the appropriate output depending on the signal wavelength. In other words, if the input wavelength is $\lambda k$, then filter 48 routes the signal to the $k^{th}$ output.

WDM filter 48 may be implemented in any suitable way and using any suitable optical technology. In an example embodiment, the filter comprises a prism or optical grating, which deflects the optical signal at an angle that depends on the wavelength. An optical grating of this sort may be etched into substrate 24 using photolithography, or otherwise fabricated in the substrate.

System 20 comprises a bank of N optical detectors that are coupled to the N respective outputs of filter 48. Each optical detector outputs a binary detection indication, which indicates the presence or absence of optical signal at the detector. In the present example, each optical detector comprises a PD 52 followed by a TIA 56. Each TIA 56 outputs a Direct Current (DC) voltage level that indicates whether or not light was detected by the respective PD 52.

It should be noted that each optical detector in the bank (PD 5+TIA 56 in the present example) is broadband and not tunable, i.e., it detects the presence or absence of light regardless of the specific wavelength of the detected light. Moreover, each optical detector typically indicates only whether or not an optical signal is present, and does not provide any indication of the signal wavelength. In other words, the detection indications of the optical detectors are binary or Boolean.

It should also be noted that, unlike PD 36 and TIA 40, PDs 52 and TIAs 56 do not perform demodulation but only energy detection. As such, PDs 52 and TIAs 56 may comprise low-speed (and therefore low-cost) components. In alternative embodiments, the bank of optical detectors may be implemented using any other suitable elements.

The bank of N optical detectors produces a set of N binary detection indications (outputs of TIAs 56). When the input wavelength is $\lambda k$, then the $k^{th}$ detection indication will be positive (i.e., optical signal is detected) and the other detection indications will be negative (i.e., optical signal is not detected).

The N binary detection indications are provided to a selector 60. Selector 60 comprises an input that is connected to a power supply 64, and N outputs that are connected respectively to N lasers 68 set to wavelengths $\lambda 1 \ldots \lambda N$. Selector 60 is configured to connect its input (the power supply) to one of its outputs (i.e., to one of lasers 68) depending on the selection inputs (i.e., depending on the binary detection indications). In this manner, selector 60 selects and activates one of lasers 68 depending on the detection indications, i.e., based on the identified input wavelength. The other lasers remain inactive since they are disconnected from the power supply.

By proper configuration of selector 60, system 20 may apply any desired mapping between input wavelength and output wavelength. In an example embodiment, system sets the output wavelength to be equal to the input wavelength. In order to apply this mapping, selector 60 is configured to connect the power supply to the $\lambda k$ laser if the $k^{th}$ detection indication is positive (i.e., if the input wavelength was identified as $\lambda k$). Alternatively, however, selector 60 may be configured to apply any other suitable mapping, in which the output wavelength is not necessarily equal to the input wavelength.

The N outputs of lasers 68 are connected to respective inputs of a transmit (TX) WDM filter 72. Filter 72 is typically similar to RX WDM filter 48 (e.g., prism-based or optical grating) and may be fabricated in a similar way. Filter 72 routes the outputs of lasers 68 to its output. The output of filter 72 thus comprises an un-modulated optical carrier signal at the selected output wavelength.

System 20 comprises a high-speed (electro-optical or non-electro-optical) modulator 76, which is driven by a high-speed modulator driver 80. Data for transmission is provided to driver 80. Thus, modulator 76 modulates the optical carrier signal with the data for transmission. The resulting output optical signal, at the output wavelength, is sent over output port 32.

The system configuration shown in FIG. 1 is an example configuration, which is chosen purely for the sake of conceptual clarity. In alternative embodiments, any other suitable system configuration can be used.

Figure 2:
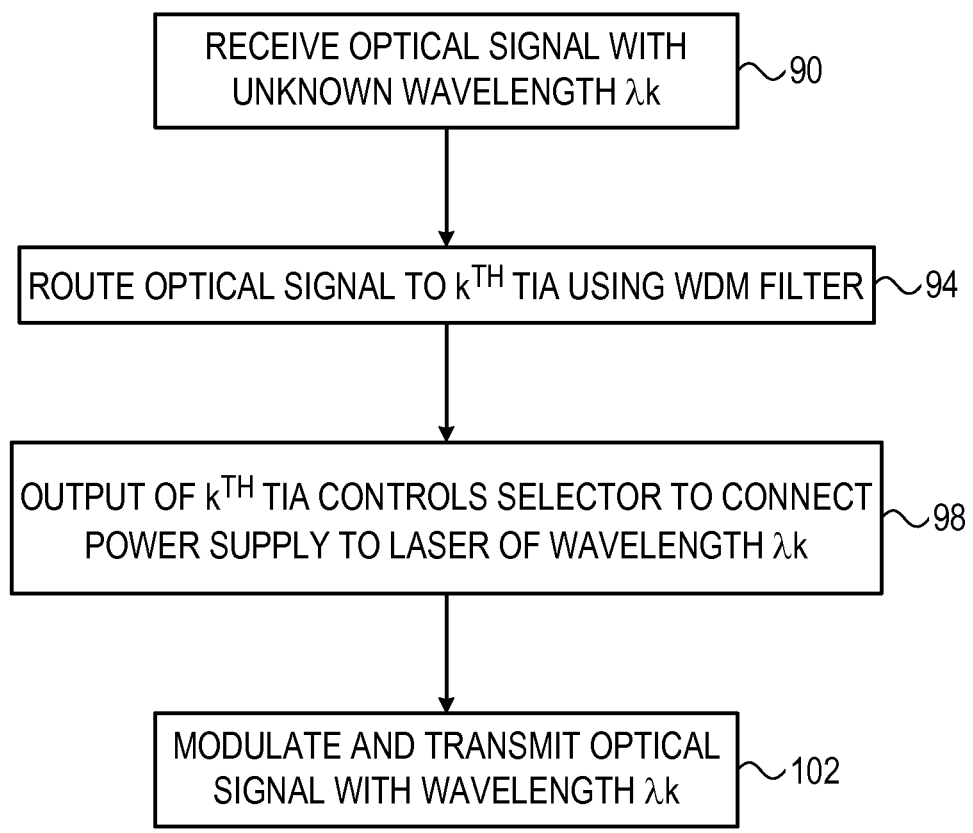
FIG. 2 is a flow chart that schematically illustrates a method for wavelength auto-negotiation, in accordance with an embodiment of the present invention.

FIG. 2 is a flow chart that schematically illustrates a method for wavelength auto-negotiation, in accordance with an embodiment of the present invention. the method begins with system 20 receiving an input optical signal over input port 28, at a reception step 90. The input signal has a wavelength $\lambda k$ that is unknown a-priori. RX WDM filter 48 routes a sample of the input signal to the $k^{th}$ optical detector, at an input routing step 94.

The output of the $k^{th}$ optical detector controls selector 60 to connect power supply 36 to the $\lambda k$ laser, at a selection step 98. TX WDM filter 72 routes the output of the $\lambda k$ laser to modulator 76. Modulator 76 modulates and transmits the optical output signal, at a transmission step 102.

Example Implementation Variations

In some embodiments, system 20 is implemented as a single SiP device using a silicon process. In a SiP implementation, the various optical components (e.g., PDs 36 and 52 and WDM filters 48 and 72) are fabricated in a silicon layer that is disposed on an insulator (e.g., silica) substrate. This sort of implementation is suitable, for example, for input and output wavelengths on the order of 1100-1600 nm. The SiP device may be fabricated, for example, in a two-dimensional (2-D) configuration having a single silicon layer (or other semiconductor layer) disposed on the insulator substrate, with the various optical and electronic circuit elements fabricated or disposed on the silicon layer.

Alternatively, the SiP device may be fabricated in a 2.5-D configuration. In such a configuration, some circuit elements are fabricated or disposed on the silicon (or other semiconductor) layer. An interposer layer is then disposed on the silicon layer. Additional circuit elements may be mounted on the interposer, and connected to the circuit using through vias that connect the upper and lower surfaces of the interposer.

Further alternatively, the SiP device may be fabricated in a 3-D configuration. In a 3-D configuration, multiple silicon layers (or other semiconductor layer) are disposed on the insulator substrate, and separated from one another by one or more interposer layers. The various optical and electronic circuit elements are fabricated in the various silicon layers of this multi-layer structure. Typically, the optical components (e.g., PDs 52 and filters 48 and 72) are fabricated in the bottom silicon layer.

In some embodiments, lasers 68 may comprise Vertical Cavity Surface Emitting Lasers (VCSELs) that are mounted on a silicon layer, e.g., using flip-chip or ball-grid interconnections. Alternatively, the lasers can be implemented by gluing of InP on the silicon, such that optical lasing occurs inside the silicon layer. Generally, the disclosed techniques can be used with any suitable type of laser, e.g., Directly Modulated Laser (DML) or Electro-absorption Modulated Laser (EML) implementations.

Alternatively to SiP, system 20 may be fabricated on a glass substrate. This sort of implementation is suitable, for example, for input and output wavelengths on the order of 800-1100 nm. In these embodiments, lasers 68 typically comprise VCSELS, filters 48 and 72 are typically etched directly in the glass substrate, and the PDs are implemented using external components.

Although the embodiments described herein mainly address High-Speed Electro-Optical (E-O) interconnect applications, the methods and systems described herein can also be used in other applications, such as in E-O telecommunication applications.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. Apparatus, comprising:
    an input port for receiving a light signal from a remote transmitter;
    a bank of optical detectors, which are configured to output respective detection indications in response to detecting a presence of an optical signal;
    an input optical filter, which is configured to receive an input optical signal having an input wavelength, from the remote transmitter, through the input port, and to route the input optical signal to one of the optical detectors in the bank depending on the input wavelength;
    a selector, which is configured to select an output wavelength based on the detection indications of the optical detectors, and to cause generation and transmission by a laser in the apparatus, of an output optical signal at the selected output wavelength;
    an output port through which the output optical signal is transmitted to a remote destination; and
    multiple lasers that are set to multiple respective output wavelengths,
    wherein the selector is configured to activate, based on the detection indications of the optical detectors, only a selected laser from among the multiple lasers that has the selected output wavelength.

2. The apparatus according to claim 1, wherein the selector is configured to activate the selected laser by connecting only the selected laser having the selected output wavelength, to a power supply.

3. The apparatus according to claim 1, and comprising an output optical filter, which is configured to route outputs of the multiple lasers to a modulator that modulates data onto the selected output wavelength.

4. The apparatus according to claim 1, wherein each of the optical detectors is non-tunable and simultaneously covers all possible values of the output wavelength.

5. The apparatus according to claim 1, wherein the bank of optical detectors and the input optical filter are fabricated in a silicon layer that is disposed on a single insulator substrate.

6. The apparatus according to claim 1, wherein the optical detectors are mounted on a single glass substrate, and wherein the input optical filter is fabricated in the glass substrate.

7. The apparatus according to claim 1, wherein the remote transmitter and the remote destination are included in a same remote node.

8. The apparatus according to claim 1, wherein the remote transmitter and the remote destination are included in different remote nodes.

9. The apparatus according to claim 1, wherein the selector is configured to select the output wavelength to be not equal to the input wavelength.

10. Apparatus, comprising:
    an input port for receiving a light signal from a remote transmitter;
    a bank of optical detectors, which are configured to output respective detection indications in response to detecting a presence of an optical signal;
    an input optical filter, which is configured to receive an input optical signal having an input wavelength, from the remote transmitter, through the input port, and to route the input optical signal to one of the optical detectors in the bank depending on the input wavelength;
    a selector, which is configured to select an output wavelength based on the detection indications of the optical detectors, and to cause generation and transmission by a laser in the apparatus, of an output optical signal at the selected output wavelength; and
    an output port through which the output optical signal is transmitted to a remote destination,
    wherein the selector is configured to select the output wavelength to be equal to the input wavelength.

11. A method, comprising:
    receiving an input optical signal having an input wavelength, from a remote transmitter;
    using an input optical filter, routing the input optical signal, depending on the input wavelength, to one of multiple optical detectors that are configured to output respective detection indications in response to detecting a presence of an optical signal;
    selecting an output wavelength based on the detection indications of the optical detectors;
    generating an output optical signal at the selected output wavelength; and
    transmitting the output optical signal to a remote destination,
    wherein generating the output optical signal comprises activating, based on the detection indications of the optical detectors, only a selected laser having the selected output wavelength from among multiple lasers that are set to multiple respective output wavelengths.

12. The method according to claim 11, wherein activating the selected laser comprises connecting only the selected laser to a power supply.

13. The method according to claim 11, wherein transmitting the output optical signal comprises routing outputs of the multiple lasers to a modulator that modulates data onto the selected output wavelength.

14. The method according to claim 11, wherein each of the optical detectors is non-tunable and simultaneously covers all possible values of the output wavelength.

15. The method according to claim 11, wherein the bank of optical detectors and the input optical filter are fabricated in a silicon layer that is disposed on a single insulator substrate.

16. The method according to claim 11, wherein the optical detectors are mounted on a single glass substrate, and wherein the input optical filter is fabricated in the glass substrate.

17. A method, comprising:
    receiving an input optical signal having an input wavelength, from a remote transmitter;
    using an input optical filter, routing the input optical signal, depending on the input wavelength, to one of multiple optical detectors that are configured to output respective detection indications in response to detecting a presence of an optical signal;

selecting an output wavelength based on the detection indications of the optical detectors;

generating an output optical signal at the selected output wavelength; and transmitting the output optical signal to a remote destination, wherein selecting the output wavelength comprises choosing the output wavelength to be equal to the input wavelength.

18. Apparatus, comprising:

an input port for receiving a light signal from a remote transmitter;

a bank of optical detectors, which are configured to output respective detection indications in response to detecting a presence of an optical signal;

an input optical filter, which is configured to receive an input optical signal having an input wavelength, from the remote transmitter, through the input port, and to route the input optical signal to one of the optical detectors in the bank depending on the input wavelength;

a selector, which is configured to select an output wavelength based on the detection indications of the optical detectors, and to cause generation and transmission by a laser in the apparatus, of an output optical signal at the selected output wavelength; and an output port through which the output optical signal is transmitted to a remote destination, wherein the optical detectors are configured to output respective Boolean detection indications, which indicate presence or absence of an optical signal at the respective detector.

* * * * *